(12) United States Patent
Miller et al.

(10) Patent No.: US 11,300,365 B2
(45) Date of Patent: Apr. 12, 2022

(54) HEAT EXCHANGER AND LEAK DETECTION SYSTEM

(71) Applicant: General Electric Company, Schenectady, NY (US)

(72) Inventors: Brandon Wayne Miller, Liberty Township, OH (US); Nicholas Taylor Moore, Cincinnati, OH (US); Daniel Alan Niergarth, Norwood, OH (US); Jeffrey Douglas Rambo, Mason, OH (US); Hendrik Pieter Jacobus de Bock, Clifton Park, NY (US); William Dwight Gerstler, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 396 days.

(21) Appl. No.: 16/011,748

(22) Filed: Jun. 19, 2018

(65) Prior Publication Data

US 2019/0383564 A1 Dec. 19, 2019

(51) Int. Cl.
*F28F 1/00* (2006.01)
*G01M 3/32* (2006.01)

(52) U.S. Cl.
CPC ........... *F28F 1/003* (2013.01); *G01M 3/3227* (2013.01); *F28F 2250/06* (2013.01); *F28F 2265/26* (2013.01)

(58) Field of Classification Search
CPC .................................................. G01M 3/3227
See application file for complete search history.

(56) References Cited

U.S. PATENT DOCUMENTS

| | | | |
|---|---|---|---|
| 3,522,008 A | 7/1970 | Defabaugh et al. | |
| 4,138,856 A | 2/1979 | Orlowski | |
| 4,199,975 A | 4/1980 | Schrock et al. | |
| 4,466,481 A | 8/1984 | Wilson et al. | |
| 4,688,627 A * | 8/1987 | Jean-Luc | F22B 37/421 165/11.1 |
| 5,834,632 A | 11/1998 | Olender et al. | |
| 7,886,580 B2 | 2/2011 | Kumar et al. | |
| 8,261,593 B1 | 9/2012 | Sanders | |
| 8,291,748 B2 | 10/2012 | Kumar et al. | |
| 8,591,102 B2 | 11/2013 | Frach et al. | |
| 8,776,866 B2 | 7/2014 | Cederberg et al. | |
| 9,328,978 B2 | 5/2016 | Appukuttan et al. | |
| 9,474,186 B2 | 10/2016 | Campbell et al. | |
| 9,739,546 B2 | 8/2017 | Bertilsson et al. | |
| 9,829,259 B2 | 11/2017 | Nyander et al. | |
| 2009/0298002 A1 * | 12/2009 | Constantin | F27D 17/004 432/29 |
| 2012/0111095 A1 | 5/2012 | Sheehan | |

(Continued)

FOREIGN PATENT DOCUMENTS

| | | |
|---|---|---|
| CN | 102840034 A | 12/2012 |
| CN | 103069261 A | 4/2013 |

(Continued)

*Primary Examiner* — Daniel S Larkin
(74) *Attorney, Agent, or Firm* — Dority & Manning, P.A.

(57) ABSTRACT

A system for heat exchange and leak detection is generally provided, the system including a heat exchanger including a first wall defining a first passage containing a first fluid. A leak detection enclosure containing a leak detection medium is defined between the first wall and a second wall surrounding the first wall.

20 Claims, 7 Drawing Sheets

(56) References Cited

U.S. PATENT DOCUMENTS

2016/0091262 A1*  3/2016  Chainer ............. H05K 7/20772
                                                165/104.31
2017/0248333 A1*  8/2017  Varley ................... F24F 5/0046

FOREIGN PATENT DOCUMENTS

| EP | 0166255 A1   |   | 1/1986  |
|----|--------------|---|---------|
| GB | 1518476 A    |   | 7/1978  |
| JP | 10-35266     | * | 2/1998  |
| JP | 2002-174458  | * | 6/2002  |
| JP | 2003/329305 A|   | 11/2003 |

* cited by examiner

HEAT EXCHANGER AND LEAK DETECTION SYSTEM

FIELD

The present subject matter relates generally to heat exchangers and leak detection systems for heat exchangers.

BACKGROUND

Heat exchanger systems often function using two or more working fluids in thermal communication. However, the working fluids may need to be fluidly segregated. Generally, the working fluids may be incompatible, volatile, or otherwise undesirable if mixed. Failure to segregate the fluids may substantially deteriorate or damage the heat exchanger system or the system to which the heat exchanger is attached. As such, there is a need for a heat exchanger and leak detection system that may detect leakage or mitigate mixing of the working fluids.

BRIEF DESCRIPTION

Aspects and advantages of the invention will be set forth in part in the following description, or may be obvious from the description, or may be learned through practice of the invention.

One aspect of the present disclosure is directed to a system for heat exchange and leak detection. The system includes a heat exchanger including a first wall defining a first passage containing a first fluid. A leak detection enclosure containing a leak detection medium is defined between the first wall and a second wall surrounding the first wall.

In one embodiment, the leak detection medium includes a fluid. The fluid defines a pressure greater than the first fluid or a second fluid surrounding the second wall.

In various embodiments, the system further includes a sensor disposed at the leak detection enclosure. In one embodiment, the sensor defines an electrical resistance sensor or an electrical conductivity sensor. In still various embodiments, the sensor defines a pressure sensor. In one embodiment, the sensor is coupled to a valve at the first passage. The valve defines a first position at or above a pressure threshold of the leak detection enclosure and a second position below the pressure threshold of the leak detection enclosure. In another embodiment, the sensor is coupled to a valve at a second passage defined between a third wall and the second wall. The valve defines a first position at or above a pressure threshold of the leak detection enclosure and a second position below the pressure threshold of the leak detection enclosure. In still another embodiment, the sensor defines a vibratory measurement sensor at the leak detection enclosure.

In one embodiment, the leak detection medium defines an electrical conductivity of approximately $3.50 \times 10^7$ or greater.

In various embodiments, the leak detection medium defines a fluid. In one embodiment, the system further includes a sensor disposed at one or more of the first passage or a second passage. The sensor is configured to detect the leak detection medium at the first fluid at the first passage or a second fluid at the second passage. In one embodiment, the leak detection medium includes an inert gas or liquid.

Another aspect of the present disclosure is directed to a heat exchanger and leak detection system. The system includes a first wall defining a first passage containing a first fluid and a second wall surrounding the first wall. A leak detection medium is in a leak detection enclosure defined between the first wall and the second wall. The system further includes one or more controllers configured to perform operations. The operations include flowing the first fluid through the first passage; flowing a second fluid in thermal communication with the second wall; and acquiring, via a sensor at the leak detection enclosure, a signal indicating fluid communication between the leak detection medium and one or more of the first fluid or the second fluid.

In various embodiments, the operations further include acquiring, via the sensor, a first leak detection value at the leak detection enclosure; acquiring, via the sensor, a second leak detection value at the leak detection enclosure; determining, via the controller, a change in leak detection value at the leak detection enclosure based at least on the acquired first leak detection value and the second leak detection value; and determining, via the controller, a leakage at the leak detection enclosure based at least on the acquired first leak detection value and the second leak detection value.

In one embodiment, determining the change in leak detection value at the leak detection enclosure includes comparing the second leak detection value to the first leak detection value over a period of time.

In another embodiment, the operations further include pressurizing the leak detection medium to a pressure at the leak detection enclosure greater than a pressure at the first passage and the second passage.

In one embodiment of the system, the operations further include acquiring, via a first passage sensor disposed at the first passage, a first leak detection value at the first passage; acquiring, via a second passage sensor disposed at the second passage, a second leak detection value at the second passage; acquiring, via the leak detection sensor, a change in leak detection value at the leak detection enclosure; and determining, via the controller, a leakage at one or more of the first passage, the second passage, and the leak detection enclosure based at least on a difference between the first leak detection value and the second leak detection value each to the change in leak detection value at the leak detection enclosure.

In another embodiment, acquiring a signal indicating leakage of the leak detection medium into the first passage and/or the second passage includes measuring a change in electrical resistance or electrical conductivity at the leak detection medium.

In still another embodiment, acquiring a signal indicating leakage of the leak detection medium into the first passage and/or the second passage includes measuring a change in vibratory measurement at the leak detection medium.

In still yet another embodiment, the operations further include adjusting an operating state of the heat exchanger based on the signal acquired from the sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
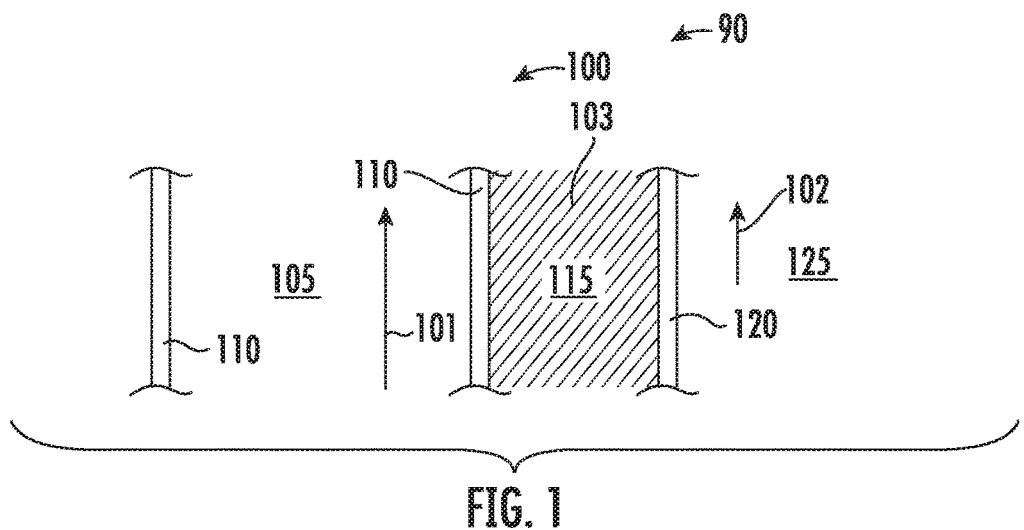
FIGS. 1-7 are schematic cross-sectional views of exemplary embodiments of a heat exchanger and leak detection system.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of a heat exchanger and leak detection system, and methods for leak detection, that may detect leakage or mitigate mixing of the working fluids are generally provided. The system generally includes a leak detection medium disposed between working fluids in a heat exchanger. Cracks, breakage, or other failures at one or more of a first wall or a second wall enclosing the leak detection medium may mitigate leakage or fluid communication between the working fluids. The leak detection medium may generally detect leakage of the working fluids and/or failure of the first wall or second wall via one or more sensors detecting a change in pressure, electrical resistivity or conductivity, vibration or acoustics, or one or more other suitable measurement parameters.

Referring now to the drawings, FIG. 1 is a schematic view of an exemplary heat exchanger and leak detection system 90 (hereinafter, "system 90") according to an aspect of the present disclosure. The system 90 may be a portion of a heat engine or heat exchanger system for land-, air-, or sea-based systems or facilities. Such systems or facilities may include, but are not limited to, liquid or gaseous heat exchangers including fuel, air, lubricant, hydraulic fluid, or gas working fluids for aviation, aeronautic, or astronautic systems, power generation systems, nuclear systems, medical systems and scientific equipment measurement systems (e.g., magnetic resonance imaging, spectroscopy, cryogenics, etc.), or other heat exchanger safety critical systems.

Referring to FIG. 1, the system 90 includes a heat exchanger 100 including a first wall 110 defining a first passage 105 containing a first fluid 101. A leak detection enclosure 115 containing a leak detection medium 103 is defined between the first wall 110 and a second wall 120 surrounding the first wall 110. A second fluid 102 at least partially surrounds the second wall 120. The second fluid 102 is in thermal communication with the first fluid 101 through the leak detection medium 103. The first fluid 101 and the second fluid 102 each define working fluids enabling heat exchange to or from one another.

Figure 2:
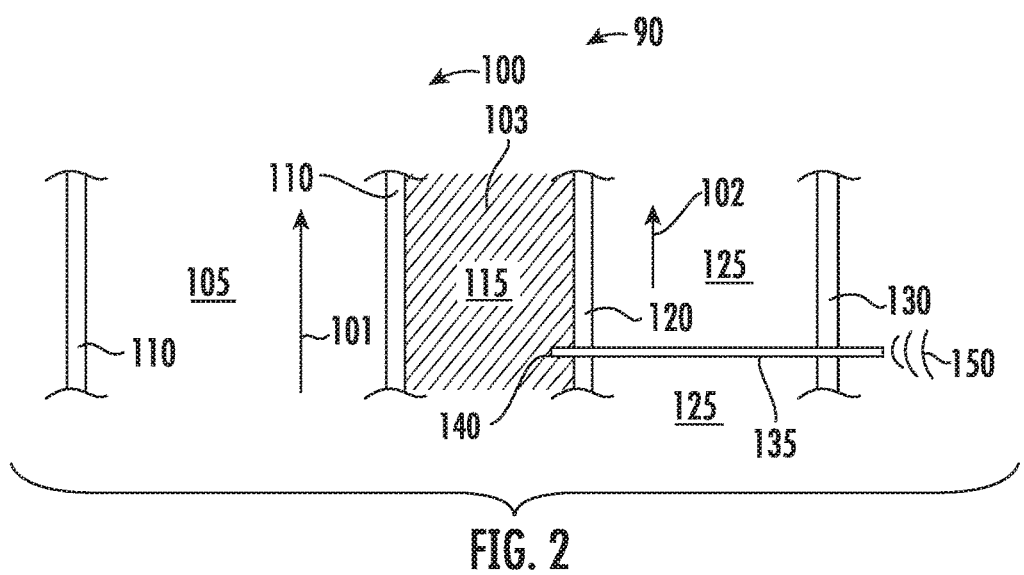
Figure 9:
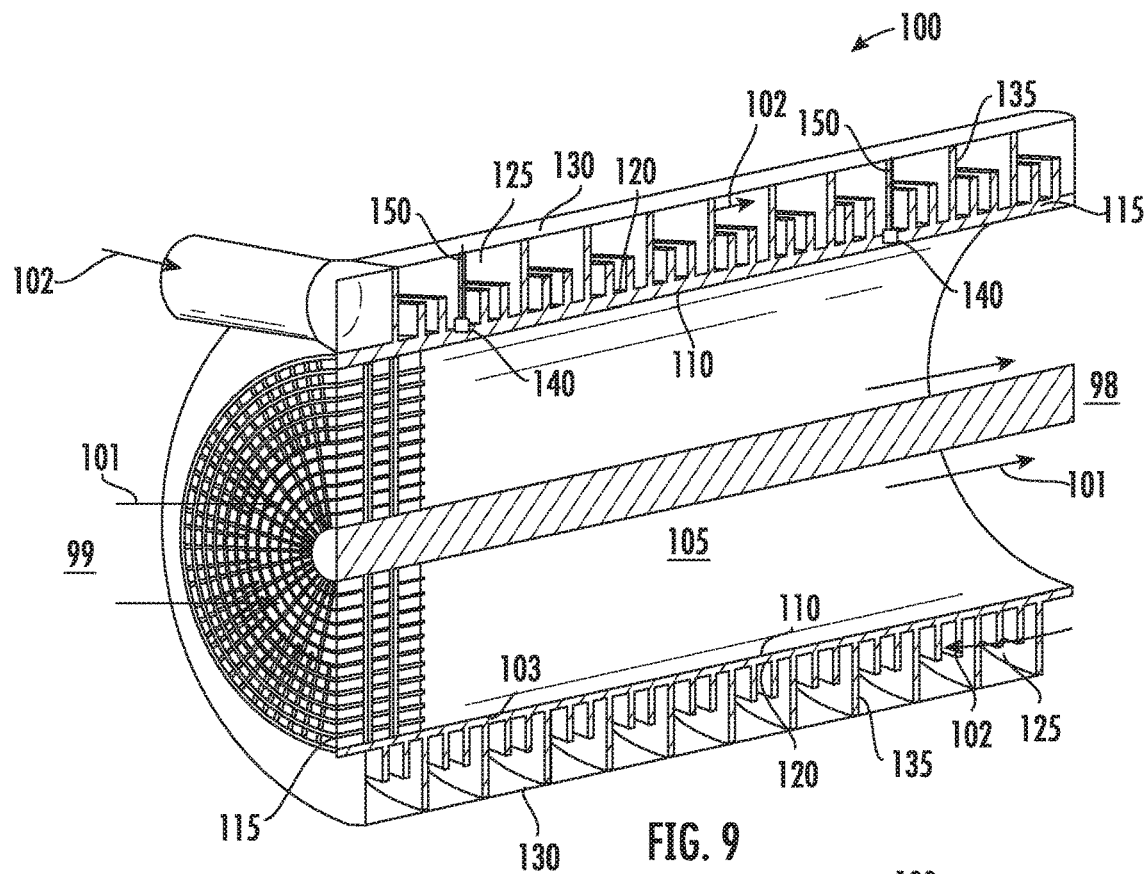
FIGS. 9-10 are cutaway perspective views of exemplary embodiments of a heat exchanger of the system according to FIGS. 1-8.
Figure 10:
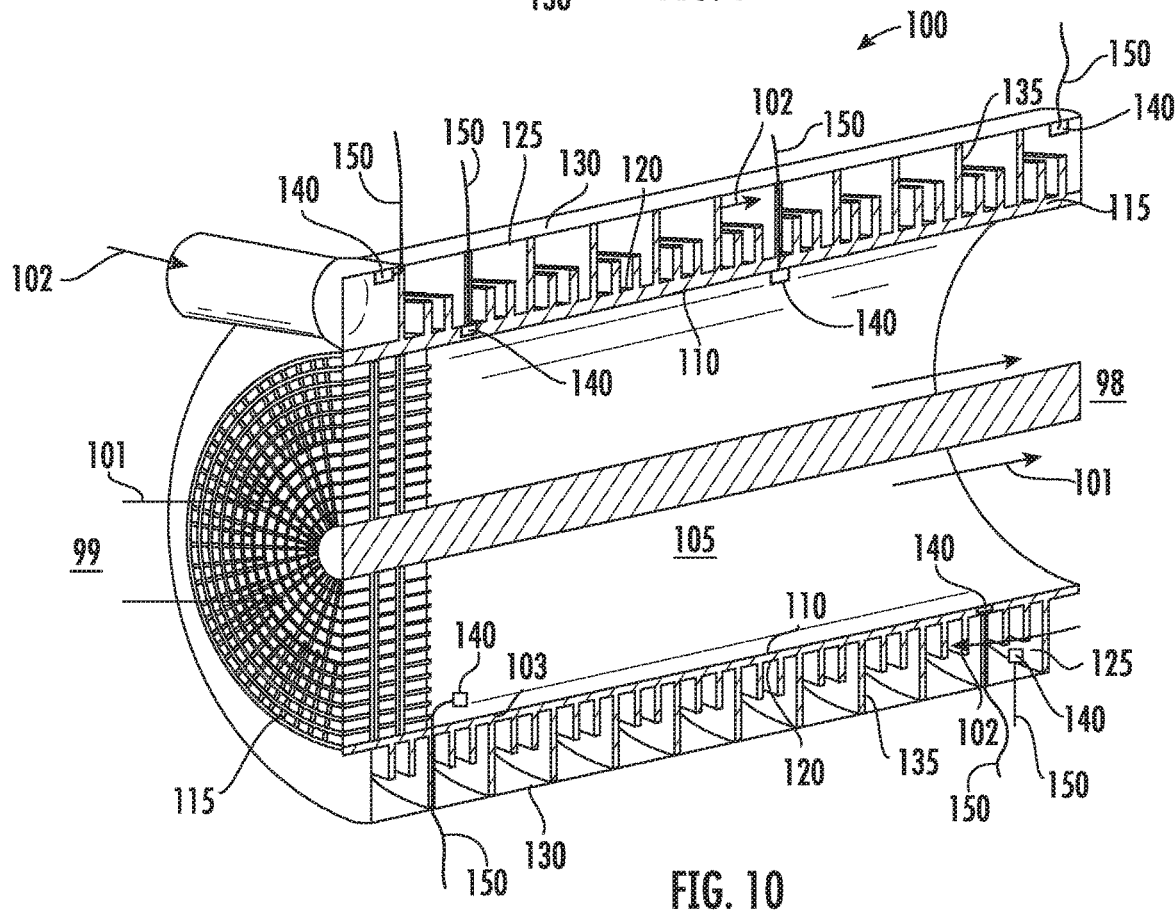

Referring now to FIG. 2, in various embodiments, the heat exchanger 100 generally depicted in regard to FIG. 1 may further include a third wall 130 surrounding the second wall 120. The third wall 130 and the second wall 120 may together define a second passage 125 therebetween at least partially containing the second fluid 102. A member 135 may couple together the third wall 130 and the second wall 120. For example, the member 135 may define a substantially rectangular, circular, ovular, polygonal, etc. pillar or column extended between the third wall 130 and the second wall 120. As another example, the member 135 may define a wall extended at least partially circumferentially around the second wall 120 (FIGS. 9-10). The member 135 may define the second passage 125 as a plurality of chambers extended substantially circumferentially around the second wall 120 (e.g., depicted in regard to FIG. 9-10). The member 135 may extend substantially circumferentially around the second wall 120 and further at least partially along a longitudinal direction such as to define a helical second passage 125 surrounding the second wall 120 (FIG. 9-10).

Referring to FIGS. 1-2, during normal operation (i.e., not leaking) of the system 90, the first wall 110 encloses the first fluid 101 within the first passage 105 fluidly segregated from the leak detection enclosure 115, the leak detection medium 103 therewithin, and/or the second fluid 102. Additionally, during normal operation, the first wall 110 and the second wall 120 together enclose the leak detection medium 103 within the leak detection enclosure 115 such as to be segregated from the first fluid 101 and the second fluid 102. Still further, during normal operation, the second wall 120 segregates the second fluid 102 from the leak detection medium 103 and the leak detection enclosure 115.

In various embodiments, the leak detection medium 103 defines a fluid. In one embodiment, the leak detection medium 103 defining the fluid is enclosed within the leak detection enclosure 115 at a pressure greater than the first fluid 101, the second fluid 102, or both. In another embodiment, the leak detection medium 103 defining the fluid is enabled to flow in a circuit at least partially defined by the leak detection enclosure 115 at a pressure greater than the first fluid 101, the second fluid 102, or both. As such, during adverse operation of the system 90, such as fluid communication between the first fluid 101 and the leak detection medium 103 or fluid communication between the second fluid 102 and the leak detection medium 103 (e.g., cracking, breakage, or other failure of the first wall 110 and/or the second wall 120) the leak detection medium 103 may generally flow from the higher pressure leak detection enclosure 115 into the first passage 105 or the second passage 125.

Figure 3:
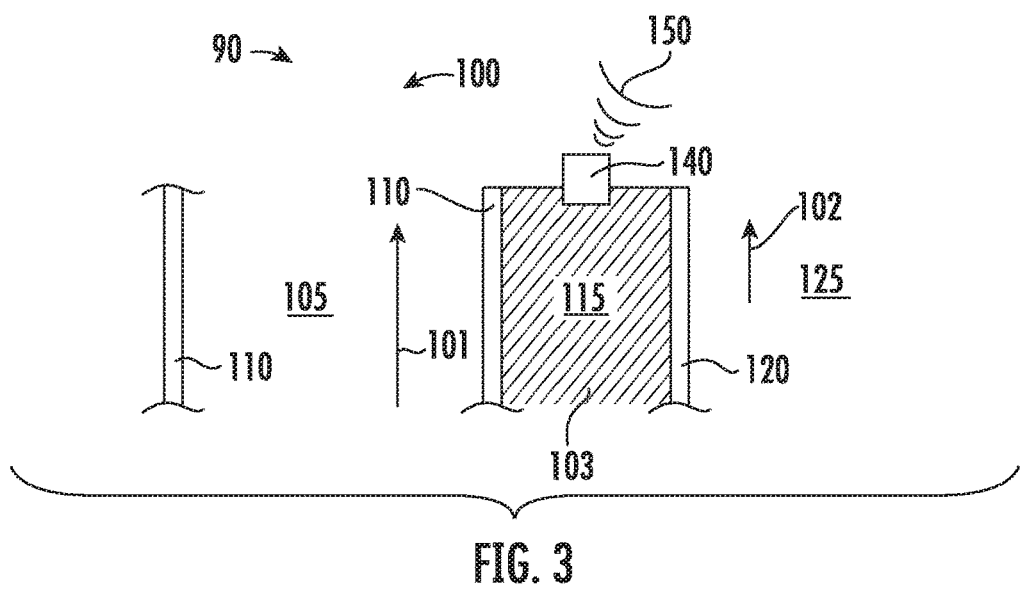

Referring now to FIGS. 2-3, various embodiments of the system 90 depicted in regard to FIGS. 1-2 further include a sensor 140 disposed at the leak detection enclosure 115. The sensor 140 generally measures, calculates, gauges, or otherwise acquires and/or transmits a signal, shown graphically at 150, indicating fluid communication between the leak detection medium 103 and one or more of the first fluid 101 or the second fluid 102. The system 90 further determines whether there is leakage at the leak detection enclosure 115 (e.g., via leakage, breakage, damage, cracks, etc. at the first wall 110 or the second wall 120) based at least on a change or difference in signals acquired from the sensor 140.

In one embodiment, the sensor 140 defines a pressure sensor. For example, the sensor 140 defining the pressure sensor generally determines, measures, calculates, gauges, or otherwise acquires and/or transmits a pressure value of the leak detection medium 103 defining the fluid. The sensor 140 defining the pressure sensor acquires a plurality pressure values at the leak detection enclosure 115.

In various embodiments, the sensor 140 defining the pressure sensor acquires a first pressure value and a second pressure value each at the leak detection enclosure 115. The system 90 determines a change in pressure or delta pressure at the leak detection enclosure 115 based at least on the acquired first pressure value and the second pressure value. In one embodiment, acquiring the second pressure value is over a period of time from the acquired first pressure value. The second pressure value and the first pressure value are compared versus the period of time to determine a change in pressure over the period of time. For example, leakage at the first wall 110 and/or the second wall 120 may be indicated via a decrease in pressure at the second pressure value over the period of time relative to the first pressure value. As another example, the leak detection medium 103 may generally be contained within the leak detection enclosure 115 as a substantially static fluid. The sensor 140 may acquire static pressure values of the leak detection medium 103 in the leak detection enclosure 115 and compare the change in pressure values over the period of time.

Figure 4:
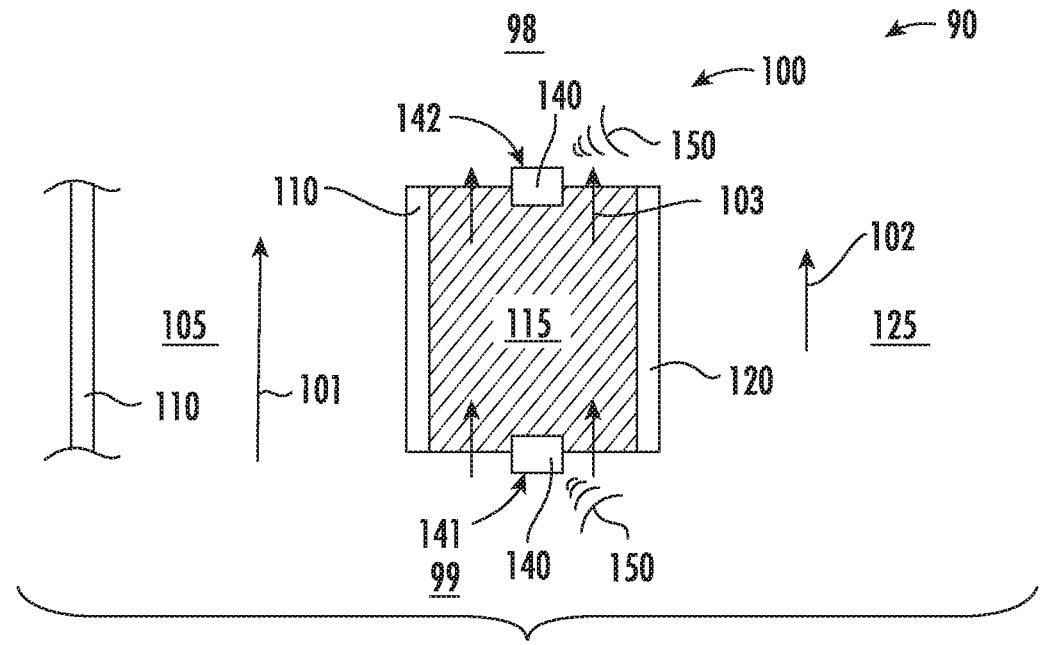
Figure 5:
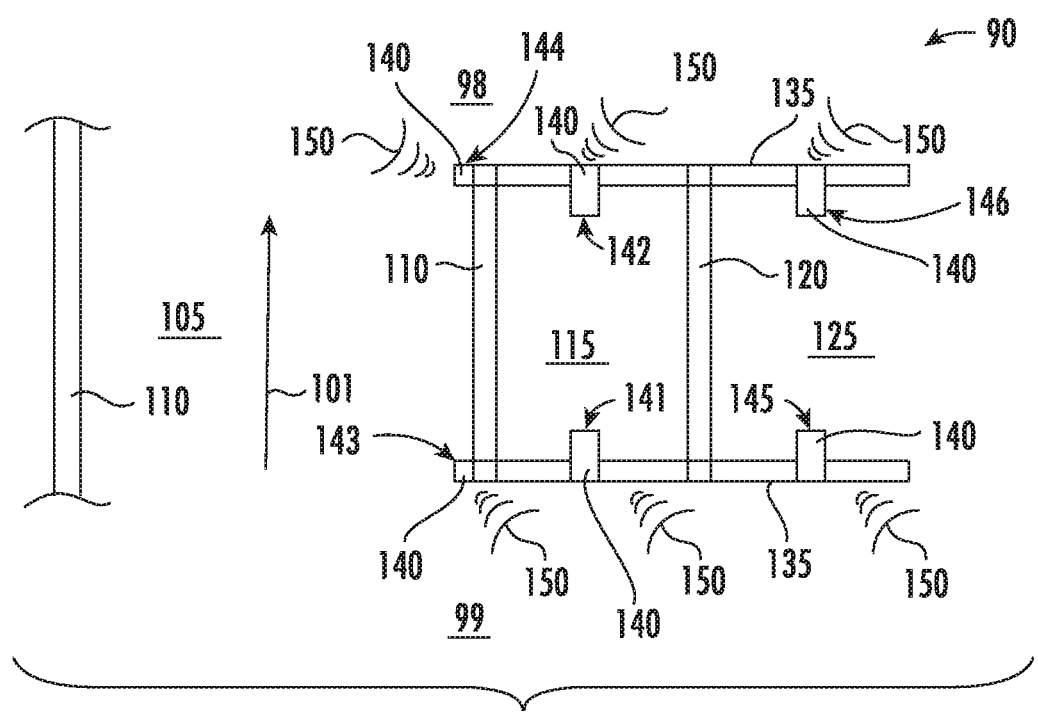

Referring now to FIGS. 4-5, in another embodiment of the system 90 generally described in regard to FIGS. 1-3, acquiring the second pressure value and the first pressure value is via a plurality of sensors 140 disposed at an upstream end 99 and a downstream end 98 of the system 90. For example, the system 90 may include an upstream sensor 141 disposed proximate to the upstream end 99 and a downstream sensor 142 disposed proximate to the downstream end 98.

Referring to FIG. 4, the sensors 141, 142 may be disposed at the leak detection enclosure 115 to acquire a delta pressure value of the leak detection medium 103 defining a fluid flowing through the leak detection enclosure 115. For example, the system 90 may acquire the second pressure value via the downstream sensor 142 over a distance relative to the first pressure value via the upstream sensor 141 such as to determine a pressure loss across the distance between the sensors 141, 142. The system 90 further acquires the second pressure value and the first pressure value over a period of time, such as continuous or intermittent acquisitions, or trending to determine whether the delta pressure between the second pressure value and the first pressure value is changing over the period of time.

Referring to FIG. 5, the system 90 is configured substantially similarly as shown and described in regard to FIGS. 1-4. In FIG. 5, the plurality of sensors 140 are disposed at one or more of the first passage 105 or the second passage 125. For example, the system 90 may include an upstream first passage sensor 143 and a downstream first passage sensor 144 each disposed at the first passage 105. As another example, the system 90 may include an upstream second passage sensor 145 and a downstream second passage sensor 146 each disposed at the second passage 125. The first passage sensors 143, 144 acquire a delta pressure value of the first fluid 101 defining a fluid flowing through the first passage 105. The second passage sensors 145, 146 acquire a delta pressure value of the second fluid 102 defining a fluid flowing through the second passage 125. For example, the system 90 may acquire the second pressure value via the downstream sensor 144, 146 over a distance relative to the first pressure value via the upstream sensor 143, 145 such as to determine a pressure loss across the distance between the respective pairs of first passage sensors 143, 144 and the second passage sensors 145, 146. The system 90 further acquires the second pressure value and the first pressure value over a period of time, such as continuous or intermittent acquisitions, or trending to determine whether the delta pressure between the second pressure value and the first pressure value is changing over the period of time.

In various embodiments, the sensors 140, 141, 142, 143, 144, 145, 146 may be disposed at one or more of the first passage 105, the second passage 125, or the leak detection enclosure 115 via the member 135 extended to the second wall 120. Referring to FIG. 5, in one embodiment, the member 135 may extend further to the first wall 110 such as to dispose the sensor 140, 141, 142, 143 144, 145, 146 to the first passage 105. The member 135 may generally enable egress of wires or other communication devices from the sensor 140 to a controller configured to receive and/or transmit signals from the sensor 140 and execute operations.

Referring now to FIGS. 1-5, in various embodiments, the leak detection medium 103 may define an electrical conductivity of approximately $3.50 \times 10^7$ or greater at approximately 20 degrees Celsius. For example, the leak detection medium 100 may define one or more materials including, but not limited to, aluminum, gold, copper, silver, or combinations thereof. It should be appreciated that the measure of electrical conductivity may be increase or decrease based on different temperatures. In one embodiment, the sensor 140 defines an electrical resistance sensor or an electrical conductivity sensor. For example, during normal operation of the system 90, the sensor 140 acquires a signal indicating a first electrical resistance or electrical conductivity of the leak detection medium 103. During adverse operation of the system 90, the sensor 140 acquires the signal indicating a second electrical resistance or electrical conductivity of the leak detection medium 103. The second electrical resistance or electrical conductivity may generally indicate leakage of the first fluid 101 or the second fluid 102 into the leak detection enclosure 115 such as to change the electrical resistance or conductivity of the leak detection medium 103.

Referring still to FIGS. 1-5, in still various embodiments, the sensor 140 may define a vibratory measurement sensor at the leak detection enclosure 115. For example, the sensor 140 may define an accelerometer or an acoustic measurement device. During normal operation of the system 90, the sensor 140 acquires a signal indicating a first vibratory measurement at the leak detection enclosure 115. During adverse operation of the system 90, the sensor 140 acquires the signal indicating a second vibratory measurement at the leak detection enclosure 115. The second vibratory measurement at the leak detection enclosure 115 may generally indicate leakage of the leak detection medium 103 egressing from the leak detection enclosure 115 into one or more of the first passage 105 or the second passage 125.

Additionally, or alternatively, the second vibratory measurement at the leak detection enclosure 115 may generally indicate leakage of the first fluid 101 or the second fluid 102 into the leak detection enclosure 115. Still further, the sensor 140 may acquire the signal at the first passage 105, the second passage 125, or both to indicate a change in vibratory measurement based on a leakage between the upstream end 99 and the downstream end 98. For example, one or more of the upstream sensors 141, 143, 145 may acquire a first vibratory measurement and one or more of the downstream sensors 142, 144, 146 may acquire a second vibratory measurement, such as shown and described in regard to FIG. 5. The system 90 may compare the second measurement and the first measurement to determine whether there is a leakage at the leak detection enclosure. The system 90 may further compare the second measurement and the first measurement to determine whether the leakage is at the first passage 105, the second passage 125, or both.

Referring to FIG. 5, in one embodiment, the sensor 140 may be disposed at one or more of the first passage 105 or the second passage 125 to acquire a signal indicating leakage of the leak detection medium 103 into the first passage 105 or the second passage 125. In one embodiment, the sensor 140 may define a gas detection sensor disposed at one or more of the first passage 105 or the second passage 125 to indicate leakage of the leak detection medium 103 into the first passage 105 or the second passage 125. For example, the sensor 140 defining a gas detector may more specifically define an electro-chemical gas detector. The sensor 140 defining an electro-chemical gas detector may include a chemically reactive semiconductor sensor. The chemically reactive semiconductor may include a tin-oxide based sensor in which electrical resistance is altered due to the presence of the leak detection medium 103 mixed with the first fluid 101 in the first passage 105 or the second fluid 102 in the second passage 125.

As another example, in one embodiment the sensor 140 defining a gas detection sensor may further define one or more types of spectrometers. The sensor 140 defining a spectrometer may further define one or more of a mass spectrometer, an optical spectrometer, an imaging spectrometer, or another spectrometer appropriate for detecting the leak detection medium 103 in the fluid 101, 102.

In various embodiments, the leak detection medium 103 may define a fluid substantially comprising an inert or noble gas, or liquefied form of the noble gas. The inert or noble gas may include argon, helium, xenon, neon, krypton, radon, or oganesson, or combinations thereof. The sensor 140 may define an inert or noble gas sensor such as to detect quantities of the leak detection medium 103 in the first passage 105 or the second passage 125, such as one or more aforementioned embodiments of the sensor 140.

Figure 6:
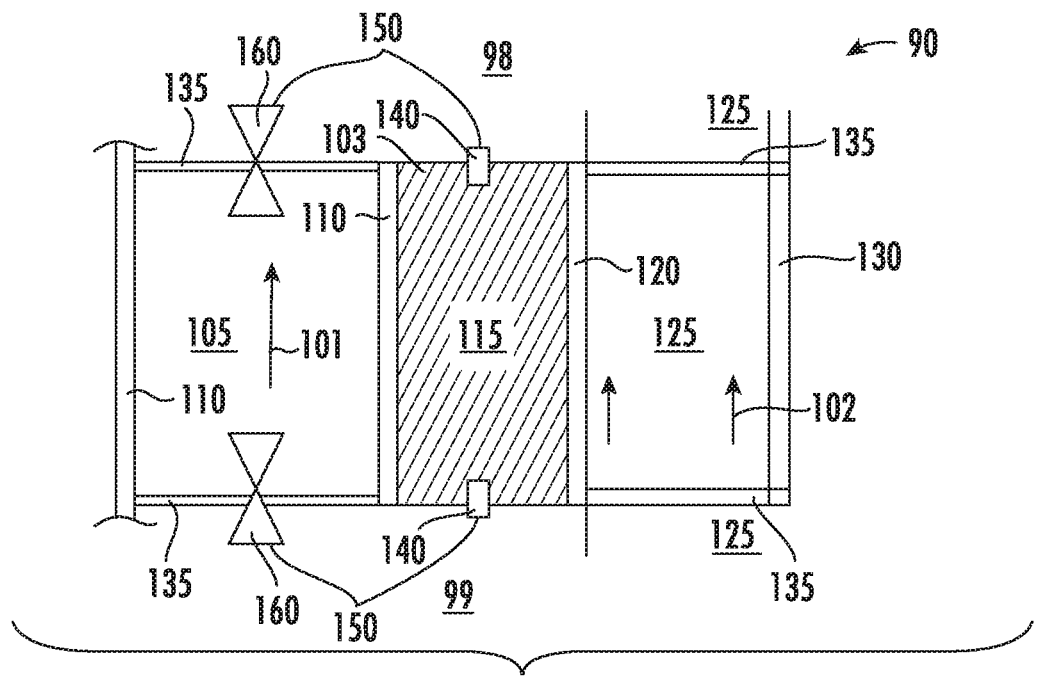
Figure 7:
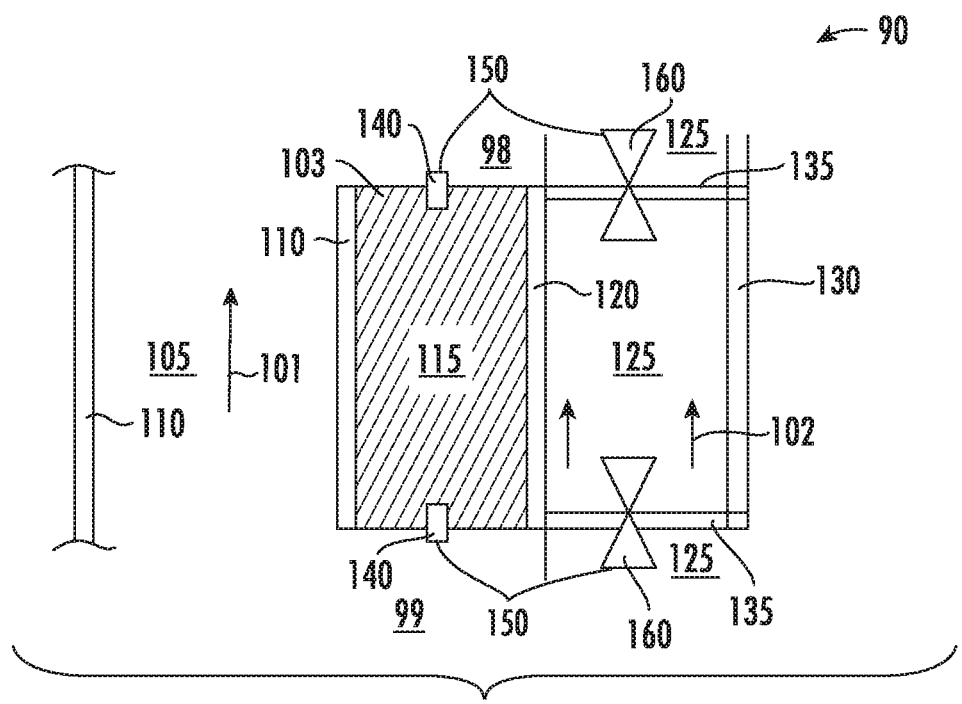

Referring now to FIGS. 6-7, the system 90 shown and described in regard to FIGS. 1-5 may further include a valve 160 coupled to the sensor 140. The valve 160 defines a first position at or above a pressure threshold of the leak detection enclosure 115. The valve 160 further defines a second position below the pressure threshold at the leak detection enclosure 115. In one embodiment, such as shown in regard to FIG. 6, the valve 160 is disposed at the first passage 105. In another embodiment, such as shown in regard to FIG. 7, the valve 160 is disposed at the second passage 125. In other embodiments, the valve 160 may be disposed at the first passage 105 and the second passage 125. The valve 160 receives a signal from the sensor 140 indicating the pressure value at the leak detection enclosure 115. When the pressure value is greater than or equal to a predetermined pressure threshold, the valve 160 defines the first position (e.g., an open position) such as to enable flow of the first fluid 101 through the first passage 105, or to enable flow of the second fluid 102 through the second passage 125, or both. When the pressure value is less than the predetermined pressure threshold, the valve 160 defines the second position (e.g., a closed position) such as to reduce or disable flow of the first fluid 101 through the first passage 105, or flow of the second fluid 102 through the second passage 125, or both.

Referring now to FIGS. 1-7, the system 90 may further pressurize the leak detection enclosure 115. For example, the system 90 may pressurize the leak detection enclosure 115 to or above the pressure threshold, such as to enable the system 90 to detect leakage of the leak detection medium 103 such as described in regard to FIGS. 1-7. The system 90 may further pressurize the leak detection enclosure 115 to or above the pressure threshold such as to enable flow of the first fluid 101 and/or the second fluid 102 such as described in regard to FIGS. 6-7. In various embodiments, the pressure threshold may define a predetermined pressure value at the leak detection enclosure 115. In other embodiments, the pressure threshold may define a predetermined pressure differential above the pressure value at the first passage 105 or the pressure value at the second passage 125. For example, the predetermined pressure differential may be 1 megapascal (Mpa) or more (e.g., or 5 Mpa, or 10 Mpa, or 100 Mpa, etc.) greater than the greater of the pressure value at the first passage 105 or the pressure value at the second passage 125. As another example, the predetermined pressure differential may be a predetermined percentage greater than one or more of the first passage 105 or the second passage 125 (e.g., 1% greater, or 5% greater, or 10% greater, or 20% greater, etc.). In still various embodiments, the predetermined pressure threshold may be based on a curve, chart, function, schedule, regression, or transfer function based on one or more pressure values at the first passage 105, the second passage 125, or both.

Figure 8:
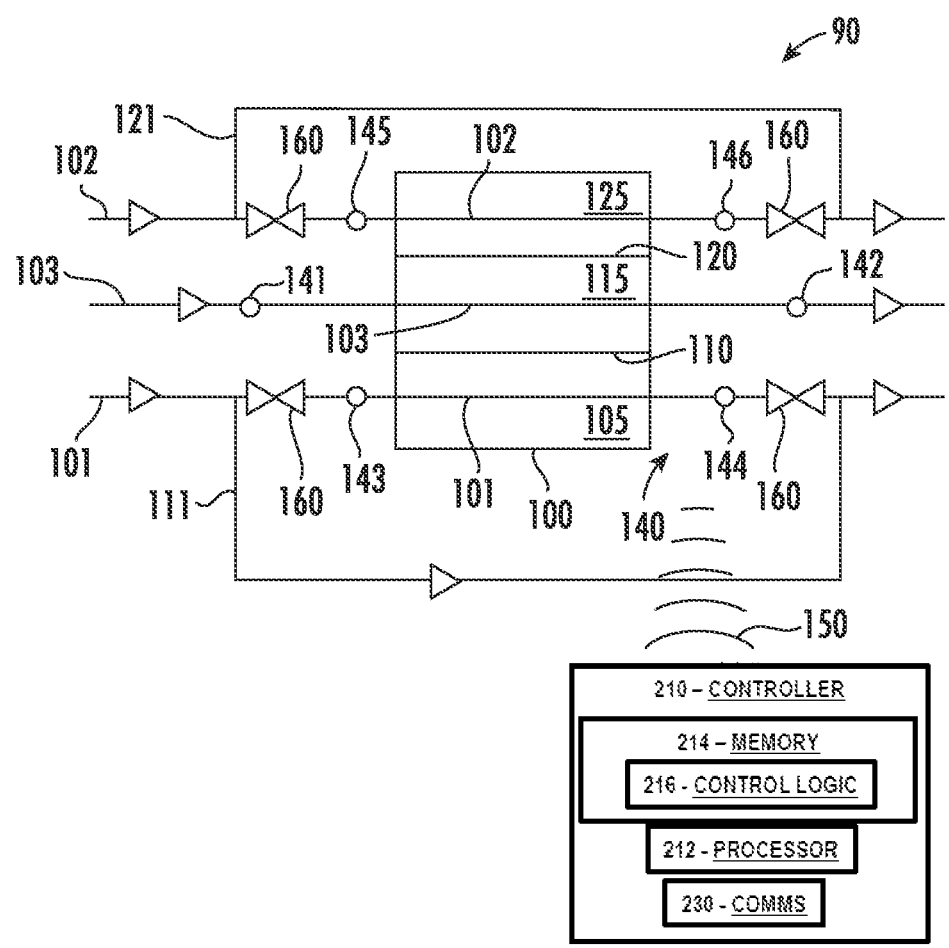
FIG. 8 is a schematic view of an exemplary embodiment of the system shown and described in regard to FIGS. 1-7.

Referring now to FIG. 8, a schematic view of the system 90 generally shown and described in regard to FIGS. 1-7 is provided. It should be appreciated that although the schematic generally provided in regard to FIG. 8 includes features shown or described in regard to one or more of the embodiments shown and described in regard to FIGS. 1-7, the system 90 may include arrangements or embodiments specific to one or several of the embodiments shown in regard to FIGS. 1-7.

The system 90 may further include one or more bypass conduits 111, 121 enabling bypass of one or more of the fluids 101, 102 around all or part of the heat exchanger 100. The bypass conduit 111, 121 may enable bypass of one or more of the fluids 101, 102 based at least on the determined leakage at the heat exchanger 100 such as described above. In one embodiment, the fluid 101, 102 may bypass the heat exchanger 100 via the bypass conduits 111, 121 when the valve 160 defines the second position such as described in regard to FIGS. 6-7. The first bypass conduit 111 may enable bypass of the first fluid 101 from entering the first passage 105 of the heat exchanger 100. The second bypass conduit 121 may enable bypass of the second fluid 102 from entering the second passage 125 of the heat exchanger 100. During adverse operation of the system 90, such as indicating a leakage, the system 90 may reduce or disable flow of one or more of the fluids 101, 102 into the heat exchanger 100 such as to reduce, mitigate, or eliminate undesired mixing of the fluids 101, 102 due to leakage.

Embodiments shown and described in regard to FIGS. 1-8 may define a passive arrangement, such as the sensor 140 providing the signal to the valve 160 and the valve 160 adjusting positions such as described above. Additionally, or alternatively, the system 90 may define an active arrangement further including a controller 210 such as depicted schematically in FIG. 8.

In general, the controller 210 can correspond to any suitable processor-based device, including one or more computing devices. For instance, FIG. 8 illustrates one embodiment of suitable components that can be included within the controller 210. As shown in FIG. 8, the controller 210 can include a processor 212 and associated memory 214 configured to perform a variety of computer-implemented functions. In various embodiments, the controller 210 may be configured to operate the system 90 such as according to one or more steps of a method for leak detection at a heat exchanger system (hereinafter, "method 1000") generally described herein in regard to FIGS. 1-10 and outlined in regard to FIG. 11.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 may include control logic 216 stored in memory 214. The control logic 216 may include instructions that when executed by the one or more processors 212 cause the one or more processors 212 to perform operations such as described in regard to method 1000.

Figure 12:
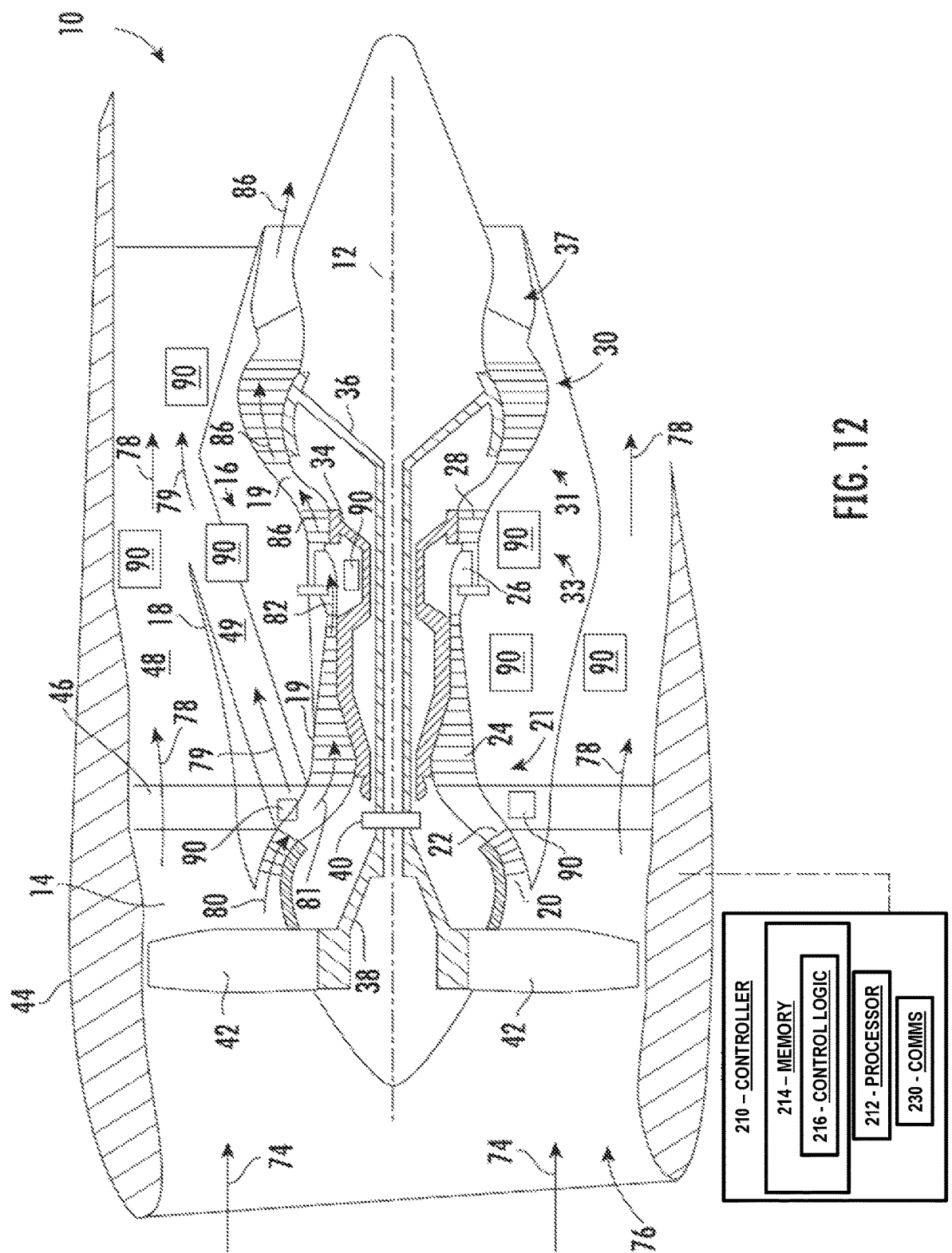
FIG. 12 is an exemplary embodiment of a heat engine at which exemplary embodiments of the system and methods shown and described in regard to FIGS. 1-11 may be disposed.

Additionally, as shown in FIG. 12, the controller 210 may also include a communications interface module 230. In various embodiments, the communications interface module 230 can include associated electronic circuitry that is used to send and receive data. As such, the communications interface module 230 of the controller 210 can be used to receive data from the system 90 (e.g., the sensors 140, 141, 142, 143, 144, 145, 146) providing pressure, flow, or temperature values, vibratory or acoustic measurements, electrical resistivity or conductivity measurements, or gas detection, or combinations thereof. In addition, the communications interface module 230 can also be used to communicate with any other suitable components of the system 90, including any number of valves 160 or bypass conduits 111, 121 configured enable, disable, or alter flow of the fluids 101, 102, 103 through the system 90.

It should be appreciated that the communications interface module 230 can be any combination of suitable wired and/or wireless communications interfaces and, thus, can be communicatively coupled to one or more components of the system 90 via a wired and/or wireless connection. As such, the controller 210 may operate, modulate, or adjust operation of the system 90, acquire or transmit signals via the sensor 140, or determine leakage at the leak detection enclosure 115, or other steps such as described in regard to the method 1000.

Referring now to FIGS. 9-10, perspective cutaway views of exemplary embodiments of the heat exchanger 100 of the system 90 are generally provided in accordance to one or more embodiments shown and described in regard to FIGS. 1-8. All or part of the system 90 including the heat exchanger 100 may be part of a single, unitary component and may be manufactured from any number of processes. These manufacturing processes include, but are not limited to, those referred to as "additive manufacturing" or "3D printing". Additionally, any number of casting, machining, welding, brazing, or sintering processes, or any combination thereof, may be utilized to construct the heat exchanger 100, including, but not limited to, the first wall 110, the second wall 120, the third wall 130, the member 135, passages, cavities, openings, or egresses for the sensor 140 and/or valve 160, or combinations thereof. Furthermore, the system 90 may constitute one or more individual components that are mechanically joined (e.g. via bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include high-strength steels, titanium and titanium-based alloys, nickel and cobalt-based alloys, aluminum, and/or metal, polymer, or ceramic matrix composites, or combinations thereof.

Referring to FIGS. 1-10, in various embodiments, one or more of the fluids 101, 102, 103 define a liquid or gaseous fuel, compressed air, refrigerant, liquid metal, inert gas, a supercritical fluid, compressed air, or combinations thereof. Various embodiments of the fluids 101, 102, 103 defining a supercritical fluid may include, but is not limited to, carbon dioxide, water, methane, ethane, propane, ethylene, propylene, methanol, ethanol, acetone, or nitrous oxide, or combinations thereof.

In still various embodiments, the fluids 101, 102, 103 defining a refrigerant may include, but is not limited to, halon, perchloroolefin, perchlorocarbon, perfluoroolefin, perfluororcarbon, hydroolefin, hydrocarbon, hydrochloroolefin, hydrochlorocarb on, hydrofluoroolefin, hydrofluorocarbon, hydrochloroolefin, hydrochlorofluorocarbon, chlorofluoroolefin, or chlorofluorocarbon type refrigerants, or combinations thereof.

Still further various embodiments of fluids 101, 102, 103 defining a refrigerant may include methylamine, ethylamine, hydrogen, helium, ammonia, water, neon, nitrogen, air, oxygen, argon, sulfur dioxide, carbon dioxide, nitrous oxide, or krypton, or combinations thereof.

Various embodiments of the system 90 may adjust an operating state of the heat exchanger 100 based on the signal acquired from the sensor 140. Adjusting the operating state of the system 90 may include adjusting a pressure, flow rate, and/or temperature of fluid 101, 102 at the heat exchanger 100. Additionally, or alternatively, adjusting the operating state of the system 90 may include bypassing one or more of the fluids 101, 102 via one or more of the bypass conduits 111, 121. Furthermore, or alternatively, adjusting the operating state of the system 90 may include adjusting or modulating the valve 160 to adjust the pressure, flow rate, and/or temperature of one or more of the fluids 101, 102 at the heat exchanger 100.

Figure 11:
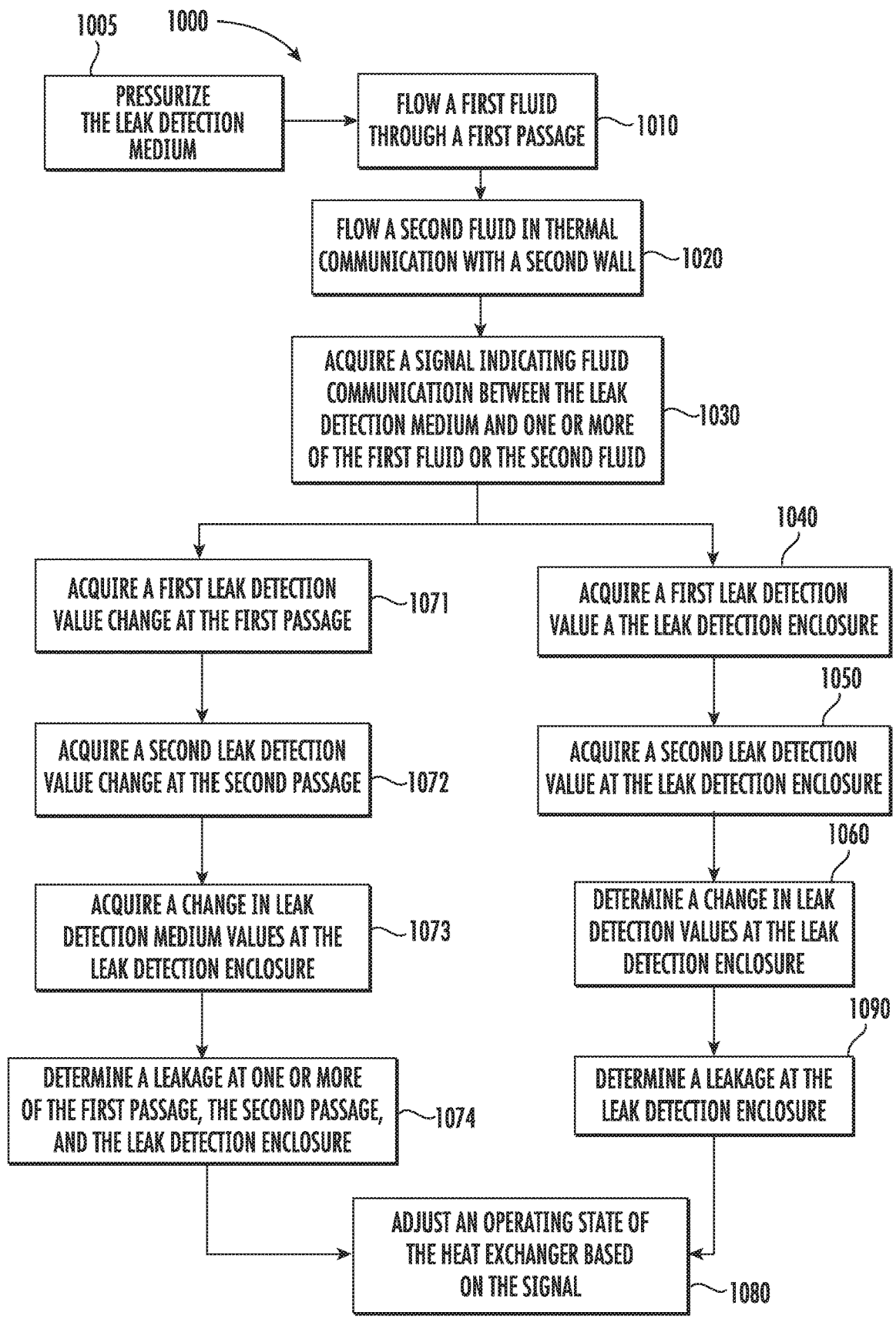
FIG. 11 is a flowchart outlining exemplary steps of a method for leak detection at a heat exchanger system.

Referring now to FIG. 11, a flowchart outlining exemplary steps of a method for leak detection at a heat exchanger system is generally provided (hereinafter, "method 1000"). Although generally shown and described in regard to FIGS. 1-10, the method 1000 may be performed or utilized in other structures or systems not generally provided herein. Additionally, although the steps outlined herein are presented in a particular order, the steps may be rearranged, reordered, omitted, added, or otherwise altered without deviating from the scope of the present disclosure.

The method 1000 may include at 1010 flowing the first fluid through the first passage; at 1020 flowing a second fluid in thermal communication with the second wall; and at 1030 acquiring a signal indicating fluid communication between the leak detection medium and one or more of the first fluid or the second fluid, such as shown and described in regard to the system 90 in FIGS. 1-10.

In various embodiments, the method 1000 may further include at 1040 acquiring a first leak detection value at the leak detection enclosure; at 1050 acquiring a second leak detection value at the leak detection enclosure; and at 1060 determining a change in leak detection values at the leak detection enclosure based at least on the acquired first leak detection value and the second leak detection value.

In still various embodiments, the leak detection value may be acquired via a sensor (e.g., sensor 140, 141, 142, 143, 144, 145, 146) at step 1030. The sensor may acquire leak detection values indicating a pressure value, an electrical resistivity or conductivity, a vibratory or acoustic measurement. In one embodiment at 1030, acquiring a signal indicating leakage of the leak detection medium into the first passage and/or the second passage includes measuring a change in electrical resistance or electrical conductivity at the leak detection medium. In another embodiment at 1030, acquiring a signal indicating leakage of the leak detection medium into the first passage and/or the second passage includes measuring a change in vibratory measurement at the leak detection enclosure, the first passage, or the second passage.

In one embodiment at 1060, determining a change in leak detection values at the leak detection enclosure includes comparing the second leak detection value to the first leak detection value over a period of time. In various examples, such as described in regard to FIGS. 1-10, comparing the leak detection values may include comparing static pressure measurements at the leak detection enclosure over a period of time to determine a change (e.g., decrease) indicating leakage of the leak detection medium into the first passage, the second passage, or both. As another example, comparing the leak detection values may include comparing a change in difference between a downstream leak detection value and an upstream leak detection value over a period of time. In still another example, comparing the leak detection values may include comparing a change in presence of the leak detection medium in the first fluid or the second fluid (e.g. a change indicating presence of the leak detection medium defining an inert gas in the first fluid or second fluid). In still various examples, comparing leak detection values includes comparing changes in vibratory measurements, pressures, or electrical resistance or conductance.

In various embodiments, the method 1000 further includes at 1071 acquiring a first leak detection value change at the first passage; at 1072 acquiring a second leak detection value change at the second passage; at 1073 acquiring a change in leak detection medium values at the leak detection enclosure; and at 1074 determining a leakage at one or more of the first passage, the second passage, and the leak detection enclosure based at least on a difference between the first leak detection value change and the second leak detection value change each to the change in leak detection medium values at the leak detection enclosure.

In yet another embodiment, the method 1000 may further include at 1080 adjusting an operating state of the heat exchanger (e.g., heat exchanger 100) based on the signal acquired from the sensor. In various embodiments, adjusting the operating state may include adjusting, via the valve (e.g., valve 160), a pressure, flow rate, and/or temperature of the fluid (e.g., fluid 101, 102) entering and/or egressing the heat exchanger 100. In another embodiment, adjusting the operating state of the heat exchanger includes bypassing, at least in part, one or more of the first fluid or the second fluid from the first passage or second passage. For example, the method 1000 at 1080 may be exemplified such as shown and described in regard to FIG. 8 (e.g., the bypass conduits 111, 121).

The method 1000 may further include at 1090 determining a leakage at the leak detection enclosure based at least on the acquired first leak detection value and the second leak detection value. For example, the method 1000 at 1090 may be exemplified such as shown and described in regard to FIGS. 1-10.

The method 1000 may further include at 1005 pressurizing the leak detection medium to a pressure at the leak detection enclosure greater than a pressure at the first passage and the second passage. For example, the method 1000 at 1005 may be exemplified such as shown and described in regard to FIGS. 1-10.

Referring now to FIG. 12, a schematic partially cross-sectioned side view of an exemplary heat engine 10 (herein referred to as "engine 10") as may incorporate various embodiments of system 90 is generally provided. It should be appreciated that FIG. 12 is provided by way of example and that in various embodiments the system 90 may be incorporated into power generation systems, nuclear systems, medical systems and scientific equipment measurement systems (e.g., magnetic resonance imaging, spectroscopy, cryogenics, etc.), or other heat exchanger safety critical systems.

Although further described herein as a gas turbine engine, the engine 10 may define a steam turbine engine, or a turbo machine generally, including turbofan, turbojet, turboprop, or turboshaft gas turbine engine configurations, or combined cycle engines. As shown in FIG. 12, the engine 10 has a longitudinal or axial centerline axis 12 that extends therethrough for reference purposes. In general, the engine 10 may include a fan assembly 14 and a core engine 16 disposed downstream of the fan assembly 14.

The core engine 16 may generally include a substantially tubular outer casing 18 that defines an annular inlet 20 into a core flowpath 19 defined through the core engine 16. The outer casing 18 encases or at least partially forms, in serial flow relationship, a compressor section 21, such as having a booster or low pressure (LP) compressor 22 and a high pressure (HP) compressor 24; a combustion section 26; and an expansion section or turbine section 31, such as including a high pressure (HP) turbine 28 and a low pressure (LP) turbine 30. The turbine or expansion section 31 further includes a jet exhaust nozzle section 37 through which combustion gases 86 egress from the core engine 16. In various embodiments, the jet exhaust nozzle section 37 may further define an afterburner. The core engine 16 further defines a hot section 33 comprising the combustion section 26, the turbine or expansion section 31, and the jet exhaust nozzle section 37, through which combustion gases 86 are formed and flow. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a reduction gear 40 such as in an indirect-drive or geared-drive configuration.

As shown in FIG. 12, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the outer casing 18 of the core engine 16 so as to define a fan bypass airflow passage 48 therebetween.

During operation of the engine 10, a volume of air as indicated schematically by arrows 74 enters the engine 10 through an associated inlet 76 of the fan case or nacelle 44 and/or fan assembly 14. As the air 74 passes across the fan blades 42 a portion of the air, as indicated schematically by arrows 78, is directed or routed into the bypass airflow passage 48 while another portion of the air as indicated schematically by arrow 80 is directed or routed into the core flowpath 19 of the core engine 16 at the LP compressor 22. Air 80 is progressively compressed as it flows through the core flowpath 19 across the LP and HP compressors 22, 24 towards the combustion section 26, such as shown schematically by arrows 81 depicting an increasing pressure and temperature of the flow of compressed air and arrows 82 depicting an exit temperature and pressure from the compressor section 21 (e.g., defining an inlet temperature and pressure to the combustion section 26). The now compressed air 82 flows into the combustion section 26 to mix with a liquid or gaseous fuel and burned to produce combustion gases 86. The combustion gases 86 generated in the combustion section 26 flow downstream through the core flowpath 19 into the HP turbine 28, thus causing the HP rotor shaft 34 to rotate, thereby supporting operation of the HP compressor 24. The combustion gases 86 are then routed through core flowpath 19 across the LP turbine 30, thus causing the LP rotor shaft 36 to rotate, thereby supporting operation of the LP compressor 22 and/or rotation of the fan shaft 38 and fan blades 42. The combustion gases 86 are then exhausted through the jet exhaust nozzle section 37 of the core engine 16 to provide propulsive thrust.

In the embodiment generally provided in FIG. 12, the engine 10 further defines a third stream bypass airflow passage 49. The third stream bypass airflow passage 49 is defined at least partially through the outer casing 18 from a compressor of the compressor section 21 (e.g., the LP compressor 22) to the fan bypass airflow passage 48. The third stream bypass airflow passage 49 selectively allows a flow of the compressed air 80, 81, shown schematically by arrows 79, from a compressor of the compressor section 21 (e.g., from the LP compressor 22) to mix with the portion of air 78 in the fan bypass airflow passage 48. The engine 10 enables the third stream bypass airflow passage 49 to completely or substantially close the flow of compressed air 79 from egressing to the fan bypass airflow passage 48 based on an operating condition of the engine 10 (e.g., high power conditions), such as to increase thrust output of the engine 10. The engine 10 further enables the third stream bypass airflow passage 49 to at least partially open the flow of compressed air 79 to egress to the fan bypass airflow passage 48 based on an operating condition of the engine 10 (e.g., low or mid power conditions), such as to reduce fuel consumption.

It should be appreciated that although the exemplary embodiment of the engine 10 generally provided in FIG. 12 is presented as a three-stream turbofan configuration, the engine 10 may define a two-stream (e.g., fan bypass airflow passage 48 and core flowpath 19) or one-stream heat engine configuration (e.g., core flowpath 19). It should further be appreciated that although the exemplary embodiment of the engine 10 generally provided in FIG. 1 is presented as a two-spool turbofan configuration, the engine 10 may define a third or more spool configuration in which the LP compressor 22 defines an intermediate pressure (IP) compressor coupled to an IP shaft and IP turbine, each disposed in serial flow relationship between a respective fan assembly 14, HP compressor 24, HP turbine 28, and LP turbine 30. Still further, the three-spool configuration may further couple the fan assembly 14 to the LP turbine 30 mechanically independent from the LP/IP compressor 22 and an IP turbine. Stated alternatively, the engine 10 may define three mechanically independent spools including respective combinations of a fan assembly and LP turbine, an IP compressor and IP turbine, and an HP compressor and HP turbine.

Referring now to FIGS. 1-12, in various embodiments, one or more of the fluids 101, 102, 103 may define a liquid or gaseous fuel at the engine 10. The fuels may include, but are not limited to, gasoline or petrol, propane, ethane, hydrogen, diesel, kerosene or one or more jet fuel formulations (e.g., Jet A, JP1, etc.), coke oven gas, natural gas, or synthesis gas, or combinations thereof. The fluid 101, 102, 103 defining oxidizer generally or air may include the flow of bypass air 78, 79 from the fan assembly 14 or compressor section 21 bypassing the combustion section 26, such as described in regard to FIG. 12 and flows through the fan bypass airflow passage 48 and/or the third stream bypass airflow passage 49.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for heat exchange and leak detection, the system comprising:
 a heat exchanger defining a radial direction and comprising:
  a first wall defining a first passage containing a first fluid,
  a second wall surrounding the first wall, and
  a third wall surrounding the second wall,
 wherein the first fluid is a working fluid for the heat exchanger,
 wherein a leak detection enclosure containing a leak detection medium is defined between
  the first wall and the second wall, wherein a second passage is defined between the second wall and the third wall, wherein the second passage contains a second fluid, wherein the first passage has a larger thickness in the radial direction than the leak detection enclosure, wherein one of the first fluid and the second fluid is compressed air, and the other of the first fluid and the second fluid is a refrigerant, and wherein the leak detection medium is an inert gas.

2. The system of claim 1,
wherein the leak detection medium comprises a fluid, and
wherein the fluid has a pressure greater than the first fluid or the second fluid.

3. The system of claim 1, further comprising:
a sensor disposed at the leak detection enclosure.

4. The system of claim 3, wherein the sensor defines a vibratory measurement sensor at the leak detection enclosure.

5. The system of claim 3, wherein the sensor defines an electrical resistance sensor or an electrical conductivity sensor.

6. The system of claim 3, wherein the sensor defines a pressure sensor.

7. The system of claim 6,
wherein the sensor is coupled to a valve within the first passage,
wherein the valve defines a first position at or above a pressure threshold of the leak detection enclosure and a second position below the pressure threshold of the leak detection enclosure.

8. The system of claim 6,
wherein the sensor is coupled to a valve at a within the second passage,
wherein the valve defines a first position at or above a pressure threshold of the leak detection enclosure and a second position below the pressure threshold of the leak detection enclosure.

9. The system of claim 1, wherein the leak detection medium defines an electrical conductivity of approximately 3.50×107 or greater.

10. The system of claim 1, further comprising:
a sensor disposed at one or more of the first passage or the second passage,
wherein the sensor is configured to detect the leak detection medium at the first fluid at the first passage or the second fluid at the second passage.

11. The system of claim 1,
wherein the heat exchanger is configured to flow a first portion of the second fluid through the second passage in a parallel flow direction with respect to the first fluid through the first passage, and
wherein the heat exchanger is configured to flow a second portion of the second fluid through the second passage in a counter flow direction with respect to the first fluid through the first passage.

12. A heat exchanger and leak detection system,
the system comprising a heat exchanger defining a radial direction and comprising:
a first wall defining a first passage containing a first fluid,
a second wall surrounding the first wall,
a third wall surrounding the second wall, and
one or more controllers configured to perform operations,
wherein a leak detection medium is in a leak detection enclosure defined between the first wall and the second wall, wherein first fluid is a working fluid for the heat exchanger, wherein a second passage is defined between the second wall and the third wall, wherein the second passage contains a second fluid, wherein the first passage has a larger thickness in the radial direction than the leak detection enclosure, wherein one of the first fluid and the second fluid is compressed air, and the other of the first fluid and the second fluid is a refrigerant, and wherein the leak detection medium is an inert gas, the operations comprising:
flowing the first fluid through the first passage;
flowing the second fluid in thermal communication with the second wall; and
acquiring, via a sensor at the leak detection enclosure, a signal indicating fluid communication between the leak detection medium and one or more of the first fluid or the second fluid.

13. The system of claim 12, the operations further comprising:
acquiring, via the sensor, a first leak detection value at the leak detection enclosure;
acquiring, via the sensor, a second leak detection value at the leak detection enclosure;
determining, via the controller, a change in leak detection value at the leak detection enclosure based at least on the acquired first leak detection value and the second leak detection value; and
determining, via the controller, a leakage at the leak detection enclosure based at least on the acquired first leak detection value and the second leak detection value.

14. The system of claim 13, wherein determining the change in leak detection value at the leak detection enclosure comprises comparing the second leak detection value to the first leak detection value over a period of time.

15. The system of claim 13, the operations further comprising:
pressurizing the leak detection medium to a pressure at the leak detection enclosure greater than a pressure at the first passage and the second passage.

16. The system of claim 12, the operations further comprising:
acquiring, via a first passage sensor disposed at the first passage, a first leak detection value at the first passage;
acquiring, via a second passage sensor disposed at the second passage, a second leak detection value at the second passage;
acquiring, via the leak detection sensor, a change in leak detection value at the leak detection enclosure; and
determining, via the controller, a leakage at one or more of the first passage, the second passage, and the leak detection enclosure based at least on a difference between the first leak detection value and the second leak detection value each to the change in leak detection value at the leak detection enclosure.

17. The system of claim 12, wherein acquiring a signal indicating leakage of the leak detection medium into the first passage and/or the second passage includes measuring a change in electrical resistance or electrical conductivity at the leak detection medium.

18. The system of claim 12, wherein acquiring a signal indicating leakage of the leak detection medium into the first passage and/or the second passage includes measuring a change in vibratory measurement at the leak detection medium.

19. The system of claim 12, the operations further comprising:
   adjusting an operating state of the heat exchanger based on the signal acquired from the sensor.

20. The method of claim 12, further comprising:
   flowing a first portion of the second fluid through the second passage in a parallel flow direction with respect to the first fluid through the first passage, and
   flowing a second portion of the second fluid through the second passage in a counter flow direction with respect to the first fluid through the first passage.

* * * * *